US008681490B2

(12) United States Patent
Chen et al.

(10) Patent No.: US 8,681,490 B2
(45) Date of Patent: Mar. 25, 2014

(54) DATA STORAGE DEVICE (75) Inventors: Sheng-Kao Chen, Taipei (TW);
Ching-Hui Chen, New Taipei (TW);
Hung-Chih Wang, Kaohsiung (TW)

(73) Assignee: Lite-On Technology Corporation, Taipei (TW)

( * ) Notice: Subject to any disclaimer, the term of this patent is extended or adjusted under 35 U.S.C. 154(b) by 275 days.

(21) Appl. No.: 13/316,471

(22) Filed: Dec. 10, 2011

(65) Prior Publication Data
US 2013/0094137 A1 Apr. 18, 2013

(30) Foreign Application Priority Data
Oct. 18, 2011 (TW) .............................. 100219496 U (51) Int. Cl.
G06F 1/16 (2006.01)
H05K 7/00 (2006.01)
H05K 5/00 (2006.01)

(52) U.S. Cl.
USPC ............ 361/679.39; 361/679.31; 361/679.35; 361/737

(58) Field of Classification Search
USPC .................. 361/737, 679.31, 679.35, 679.39, 361/679.1; 439/131
See application file for complete search history.

(56) References Cited

U.S. PATENT DOCUMENTS

| | | | |
|---|---|---|---|
| 6,676,419 B1* | 1/2004 | Lin et al. ........................ 439/76.1 |
| 7,035,110 B1* | 4/2006 | Wang et al. .................... 361/737 |
| 7,286,182 B2* | 10/2007 | Silverbrook et al. ......... 348/375 |
| 7,301,596 B1* | 11/2007 | Morganstern et al. ........ 349/131 |
| 7,307,849 B2* | 12/2007 | Ho et al. ........................ 361/737 |
| 7,535,719 B2* | 5/2009 | Hiew et al. .................... 361/737 |
| 7,581,967 B2* | 9/2009 | Collantes et al. ............. 439/131 |
| 7,672,122 B2* | 3/2010 | Lin et al. ................... 361/679.31 |
| 7,679,008 B2* | 3/2010 | Lee ................................. 174/560 |
| 7,704,084 B1* | 4/2010 | Cheng ........................... 439/131 |
| D616,449 S * | 5/2010 | Lo ............................ D14/480.7 |
| D620,018 S * | 7/2010 | Nan et al. .................. D14/480.7 |
| 7,782,602 B2* | 8/2010 | Zhu .......................... 361/679.31 |
| 7,811,101 B2* | 10/2010 | Tang et al. .................... 439/131 |
| 7,869,219 B2* | 1/2011 | Ma et al. ....................... 361/737 |
| 7,894,198 B2* | 2/2011 | Zhu et al. ...................... 361/755 |
| 8,014,130 B1* | 9/2011 | Nguyen et al. ................ 361/600 |
| 8,116,083 B2* | 2/2012 | Ni et al. ......................... 361/737 |
| 8,184,441 B2* | 5/2012 | Meng et al. ................... 361/730 |
| 8,194,408 B2* | 6/2012 | Chou et al. .................... 361/737 |
| 2004/0233629 A1* | 11/2004 | Wang et al. ................... 361/684 |
| 2005/0162823 A1* | 7/2005 | Hosey ............................ 361/684 |
| 2006/0002069 A1* | 1/2006 | Chuang ......................... 361/683 |
| 2008/0076280 A1* | 3/2008 | Chi et al. ....................... 439/131 |

(Continued)

*Primary Examiner* — Adrian S Wilson
*Assistant Examiner* — Abhishek Rathod
(74) *Attorney, Agent, or Firm* — Li & Cai Intellectual Property (USA) Office (57) ABSTRACT

A data storage device includes a storage module, a casing, a sliding member, and an elastic member. The storage module has a plurality of pins and memory units electrically interconnected. The casing includes a base, three sidewall members, a support member, a first abutting portion, and an accommodating region defined cooperatively by the sidewall members. At least one guide block is disposed on each of the oppositely arranged sidewall members. The first abutting portion is formed on one side of the support member. The sliding member has a second abutting portion and at least one guide rail corresponding to its respective guide block. The support member is arranged between the sliding member and the base. The elastic member is held by the first and second abutting portions on opposite ends thereof The compression and restoration of the elastic member allows the sliding member to selectively conceal the pins.

10 Claims, 8 Drawing Sheets

(56) References Cited

U.S. PATENT DOCUMENTS

| | | | | |
|---|---|---|---|---|
| 2008/0160832 A1* | | 7/2008 | Morganstern et al. | 439/625 |
| 2008/0261450 A1* | | 10/2008 | Nguyen et al. | 439/607 |
| 2008/0280490 A1* | | 11/2008 | Nguyen et al. | 439/607 |
| 2008/0316697 A1* | | 12/2008 | Zhu | 361/684 |
| 2009/0040710 A1* | | 2/2009 | Chung | 361/684 |
| 2009/0042433 A1* | | 2/2009 | Bushby | 439/352 |
| 2009/0061696 A1* | | 3/2009 | Lin et al. | 439/701 |
| 2009/0122478 A1* | | 5/2009 | Lin et al. | 361/679.32 |
| 2009/0147460 A1* | | 6/2009 | Kung | 361/679.31 |
| 2009/0316368 A1* | | 12/2009 | Hiew et al. | 361/737 |
| 2010/0039225 A1* | | 2/2010 | Yu et al. | 340/5.83 |
| 2010/0330828 A1* | | 12/2010 | Tang et al. | 439/131 |
| 2011/0130017 A1* | | 6/2011 | Chou et al. | 439/131 |
| 2011/0300752 A1* | | 12/2011 | Chou et al. | 439/620.21 |
| 2012/0026661 A1* | | 2/2012 | Ni et al. | 361/679.4 |
| 2012/0268883 A1* | | 10/2012 | Lo | 361/679.31 |

* cited by examiner

DATA STORAGE DEVICE

BACKGROUND OF THE INVENTION

1. Field of the Invention

The present invention relates to a data storage device; more particularly, to a data storage device adaptable to a host receptacle for transferring electronic data.

2. Description of Related Art

With the advancement in electronics, the use of 3C (computer, communication, consumer) electronic devices is continuously increasing. For example, desktop computers are used in office areas, laptop computers are essential for travelers, and young consumers favor stylish smart phones such as iPhone, tablet computer, iPod, iPad, and other handheld electronic devices. These devices can provide audio and visual entertainment, internet access, e-mailing capability, computer gaming, media players, etc. Besides using wireless technology for data communication, a standard electronic device typically is equipped with at least one receptacle for mass data transfer. Particularly if the internet service is unavailable, the receptacle provides an alternative means to exchange data.

The receptacles of electronic devices come in different standards and physical properties. The most prevalent type of interface standard is the Universal Serial Bus, or USB. The popularity of USB stems from being able to quickly transfer mass electronic data and support various multimedia files. Hence, the USB interface is an essential component of electronic devices nowadays.

Conventional USB mass storage devices are manufactured in various styles and configurations. For example, there are retractable/swivel type USB connectors, push-type USB connectors, capped USB connectors, etc. Regardless the style, the internal pins and memory chip of every mass storage device are protected to reduce the risk of damage. Externally, mass storage devices can be kept conveniently in a space-saving manner. Generally speaking, to plug a USB mass storage device into a receptacle of a host computer, the internal pins must first be exposed by the user to achieve electrical connection for data transfer.

However, the extra step to expose the internal pins by removing the cap/cover or swivel arrangement is unsatisfactory in a fast-paced modern society. Therefore, industrial manufacturers are striving to develop a simplified means for plugging/unplugging the data storage device.

SUMMARY OF THE INVENTION

The purpose of the present invention is to provide a more efficient means of plugging/unplugging the data storage device.

Accordingly, the present invention provides a data storage device for electrical connection to a host receptacle. The receptacle includes an insertion slot formed thereon and an abutting portion. The data storage device comprises a storage module, a casing, a sliding member, and an elastic member. The storage module includes a base board, a plurality of pins, and at least one memory unit. The pins are in electrical connection with the memory unit, where the pins and the memory unit are arranged on the base board. The casing has a base portion and three sidewall members extending vertically from the edge portions thereof The base portion and the sidewall members cooperatively define an accommodating region for receiving the storage module. At least one guide block is disposed on each of the opposing sidewall members. A support member adjoining to the sidewall members is arranged in parallel to the base portion. The support member has a first abutting portion. The sliding member has a second abutting portion and at least one guide rail formed correspondingly to the guide block. The support member is disposed between the base portion and the sliding member. The length of the long side of the sliding member is less than the length of the opposing sidewall members. The sliding member can selectively shield the pins of the storage module. The opposite ends of the elastic member are fixed to the first abutting portion and the second abutting portion, respectively. The sliding member is operated by the compression and decompression of the elastic member to selectively shield the pins.

According to another embodiment, the second abutting portion is arranged on one end of the sliding member. When the data storage device is plugged into the insertion slot, the abutting portion abuts to the second abutting portion.

In accordance to the present invention, the sliding member is arranged on one side of the casing facing outwardly.

In accordance to the present invention, the abutting portion is arranged inside the insertion slot or on the periphery thereof.

In accordance to the present invention, the sliding member and the casing are arranged on opposite sides of the elastic member, where the elastic member is held thereinbetween.

In accordance to the present invention, the abutting portion abuts to one end of the sliding member.

In accordance to the present invention, when the storage module is disposed in the accommodating region, the base board is arranged parallelly against the top surface of the base.

In accordance to the present invention, when the storage module is disposed in the accommodating region, the base board is arranged adjacently to the support member.

Thereby, the present invention enables the user to operate the data storage device with ease. Namely, when plugging/unplugged the data storage device, the user is saved from uncapping or use swiveling means to use the data storage device. Thus, the operating procedure is simplified.

In order to further appreciate the characteristics and technical contents of the present invention, references are hereunder made to the detailed descriptions and appended drawings in connection with the present invention. However, the appended drawings are merely shown for exemplary purposes, rather than being used to restrict the scope of the present invention.

DETAILED DESCRIPTION OF EMBODIMENTS

Figure 1A:
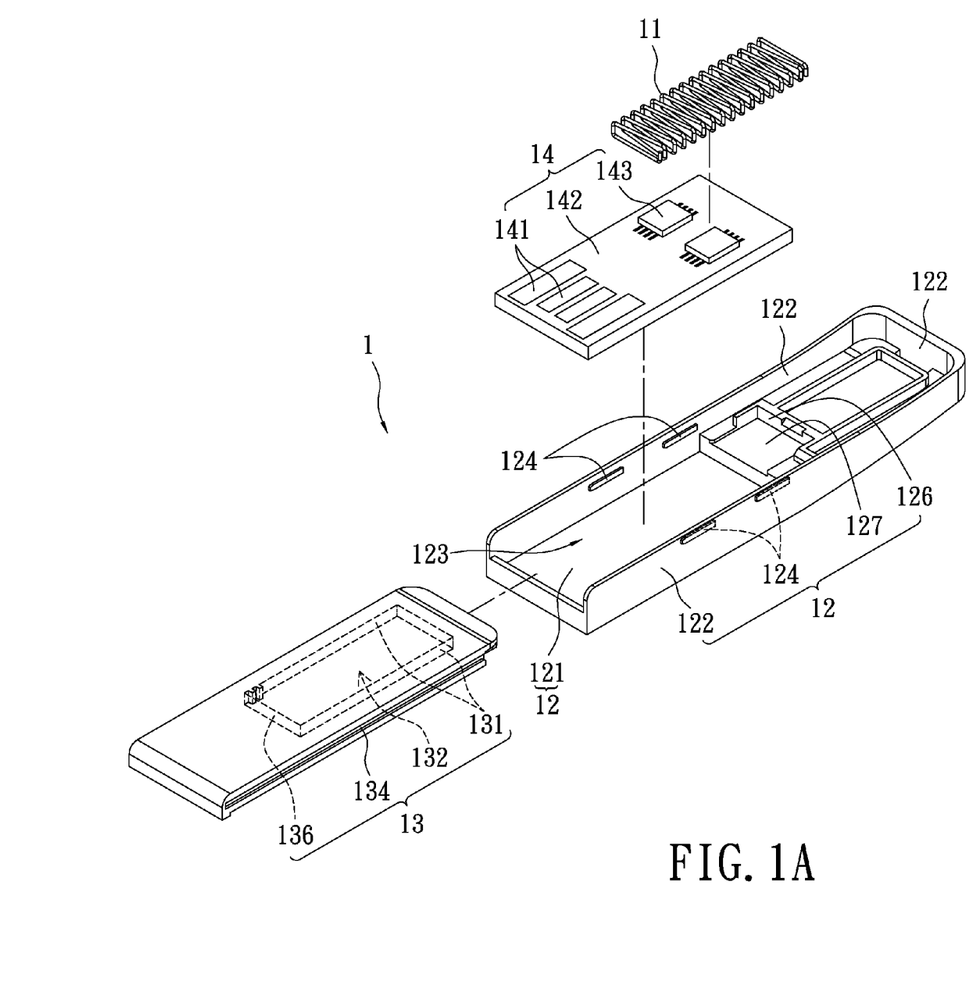
FIGS. 1A and 1B are exploded views of a data storage device for a first embodiment of the present invention.
Figure 1B:
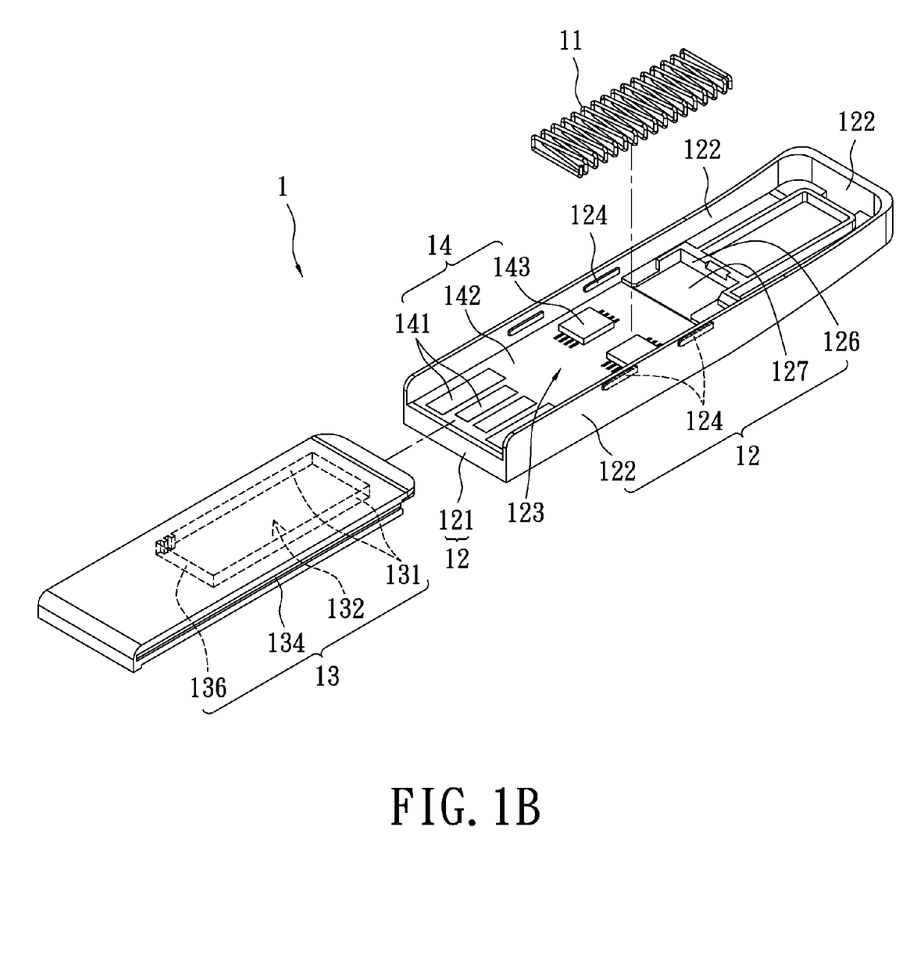

Please refer to FIGS. 1A and 1B, which are exploded views of a data storage device 1 for a first embodiment of the present invention. As shown in FIG. 1A, the data storage device 1 comprises an elastic member 11, a casing 12, a sliding member 13, and a storage module 14. The storage module 14 includes a base board 142, a plurality of memory units 143, and a plurality of pins 141. The pins 141 are made of conductive strips (copper) arrayed in parallel. The pins 141 and the memory units 143 are disposed on the base board 142. Moreover, the pins 141 and the memory units 143 are electrically connected. Therefore, the memory units 143 can be electrically connected to the host computer (not shown) for storing various digital data. The casing 12 includes a base portion 121, three sidewall members 122, a plurality of guide blocks 124, a first abutting portion 126, and a support member 127. The sidewall members 122 extend vertically from the edge portions of the base portion 121, and an accommodating region 123 is cooperatively defined by the sidewall members 122 for receiving the storage module 14. The guide blocks 124 are arranged on opposite sidewall members 122. The support member 127 adjoins or connects to the sidewall members 122 and is parallel to the base portion 121. The first abutting portion 126 is disposed adjacently on one side of the support member 127 and away from the sidewall members 122. The first abutting portion 126 is abutted by one end of the elastic member 11. The sliding member 13 has a second abutting portion 136, two side surfaces 131, and two guide rails 134. The length of the long side of the sliding member 13 is less than the length of the opposing sidewall members 122. The side surfaces 131 are formed underneath the sliding member 13 and cooperatively define a holding slot 132. The sliding member 13 is substantially plate-shaped. The second abutting portion 136 is also formed underneath the sliding member 13 adjacent to the side surfaces 131. The guide rails 134 are formed on the respective sides of the sliding member 13, and each guide rail 134 corresponds to its respective guide block 124 on the casing 12. Thereby, the sliding member 13 can be slidably arranged on the casing 12 through the cooperation between the guide rails 134 and the guide blocks 124.

The assembling steps of the data storage device 1 are discussed hereinbelow. First, the storage module 14 is disposed into the accommodating region 123. As shown in FIG. 1B, the storage module 14 is inside the accommodating region 123 surrounded by the sidewall members 122. The base board 142 is adjacent to one side of the support member 127 and parallel therewith. In addition, the base board 142 is arranged parallelly against the base portion 121. Next, the elastic member 11 is installed by abutting one end thereof to the first abutting portion 126. Then, the guide rails 134 of the sliding member 13 are aligned to the guide blocks 124 to arrange the sliding member 13 slidably on the casing 12. When the second abutting portion 136 is abutted by the elastic member 11, the data storage device 1 is fully assembled.

Figure 2A:
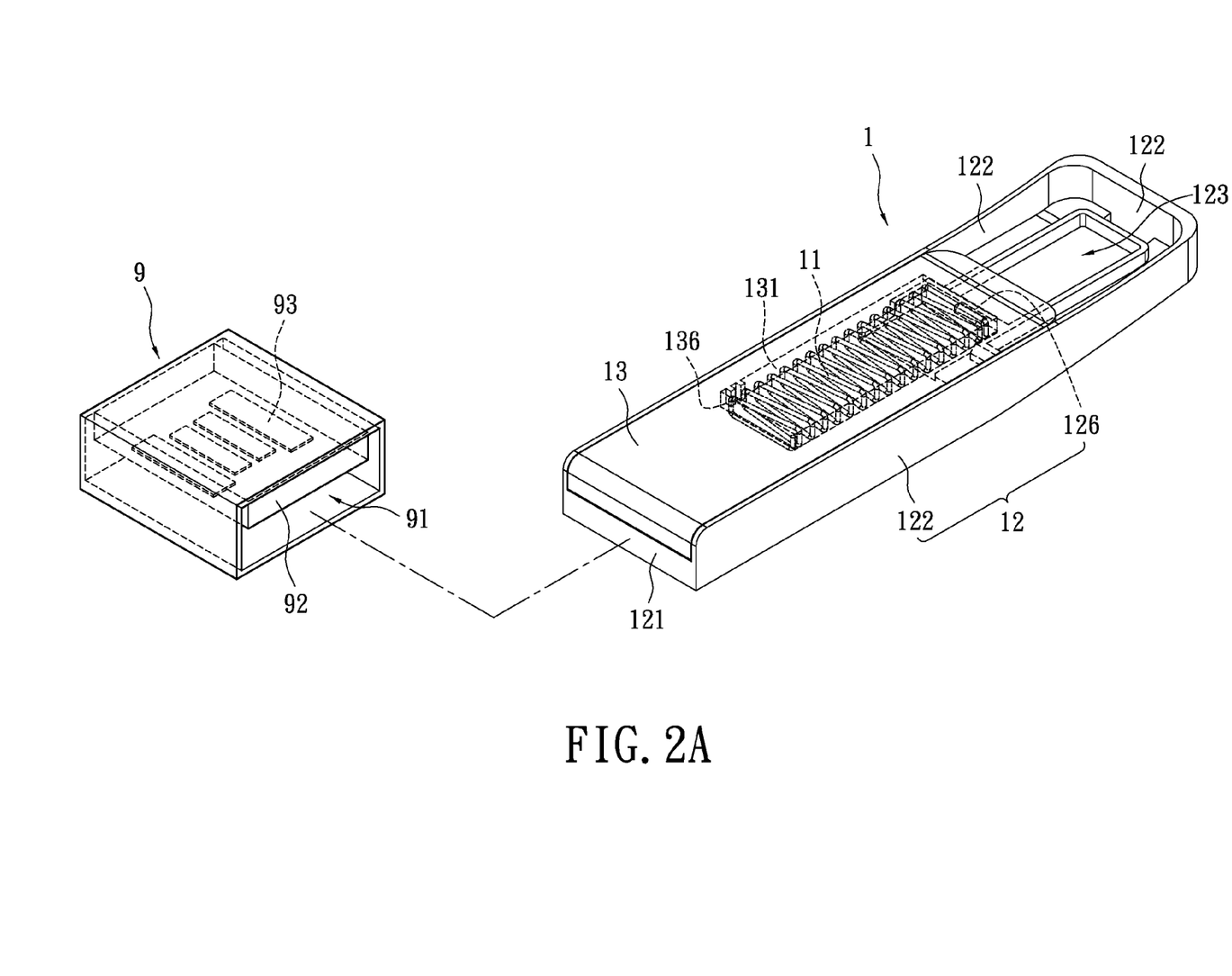
FIG. 2A shows the data storage device in FIGS. 1A and 1B before plugging into a receptacle.
Figure 2B:
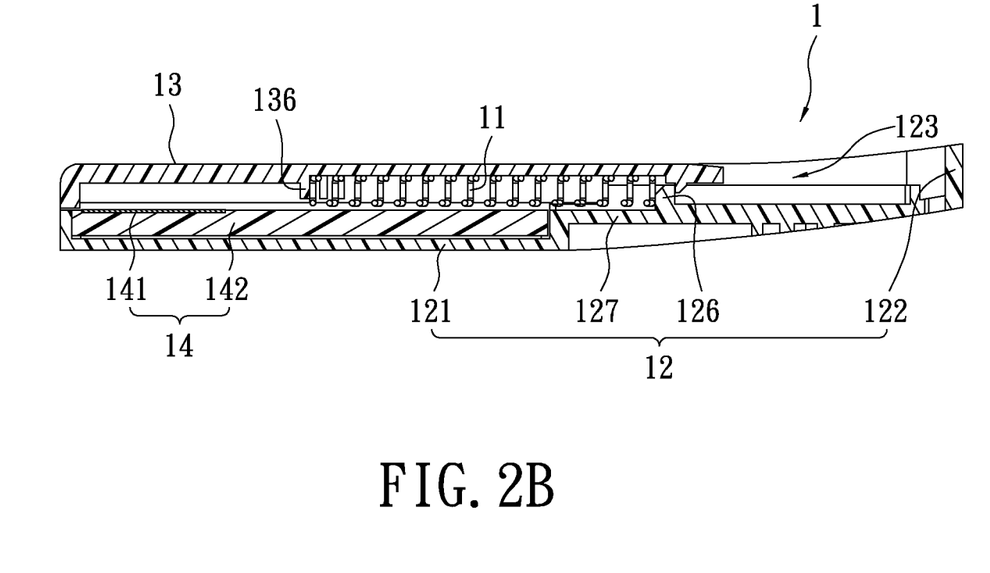
FIG. 2B is a cross-sectional view of the data storage device in FIG. 2A.

Please refer to FIGS. 2A and 2B. FIG. 2A shows the data storage device 1 of the first embodiment of the present invention before plugging to the host receptacle. Whereas FIG. 2B is a cross-sectional view of the data storage device in FIG. 2A. As shown in FIG. 2A, after the data storage device 1 has been fully assembled, the elastic member 11 is cornered between the first abutting portion 126 and the second abutting portion 136. In addition, the elastic member 11 is securely arranged inside the holding slot 132 between the side surfaces 131 against unintentional slippage or displacement. The sliding member 13 is exposingly arranged on the casing 12, where the pins 141 are shielded by the sliding member 13. In reference to FIG. 2B, the sliding member 13 and the casing 12 are arranged above and below the elastic member 11, respectively. Thereby, the elastic member 11 is held securely thereinbetween to further reduce the risk of unintentional slippage or displacement.

For the instant embodiment, the first abutting portion 126 is provided to hold one end of the elastic member 11 fixingly. Some possible fixing means include hooks, adhesives, soldering, etc. Likewise, the second abutting portion 136 is provided to hold an opposite end of the elastic member 11 using similar means.

Figure 3A:
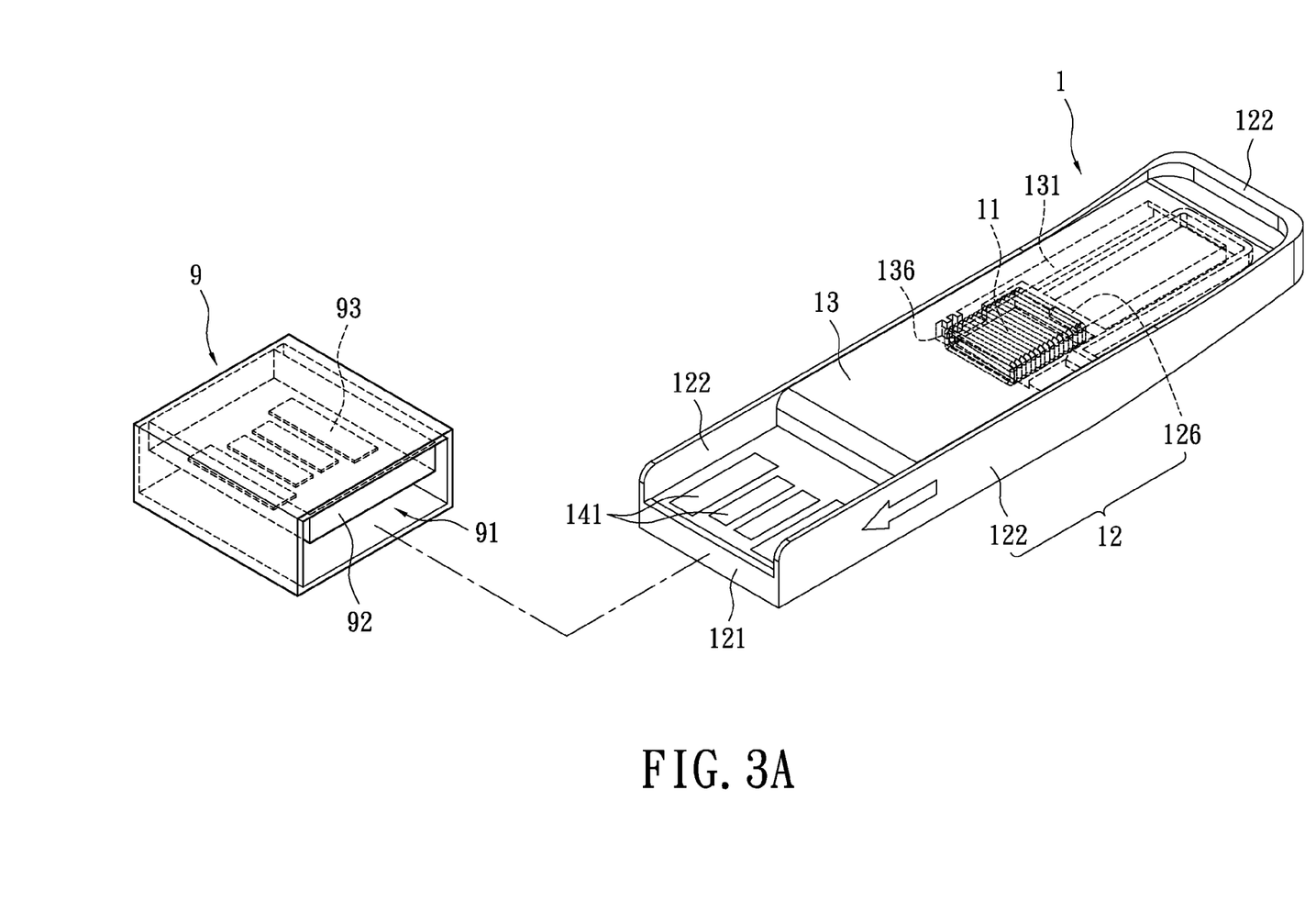
FIG. 3A shows the data storage device in FIG. 1A and 1B after plugging into a receptacle.
Figure 3B:
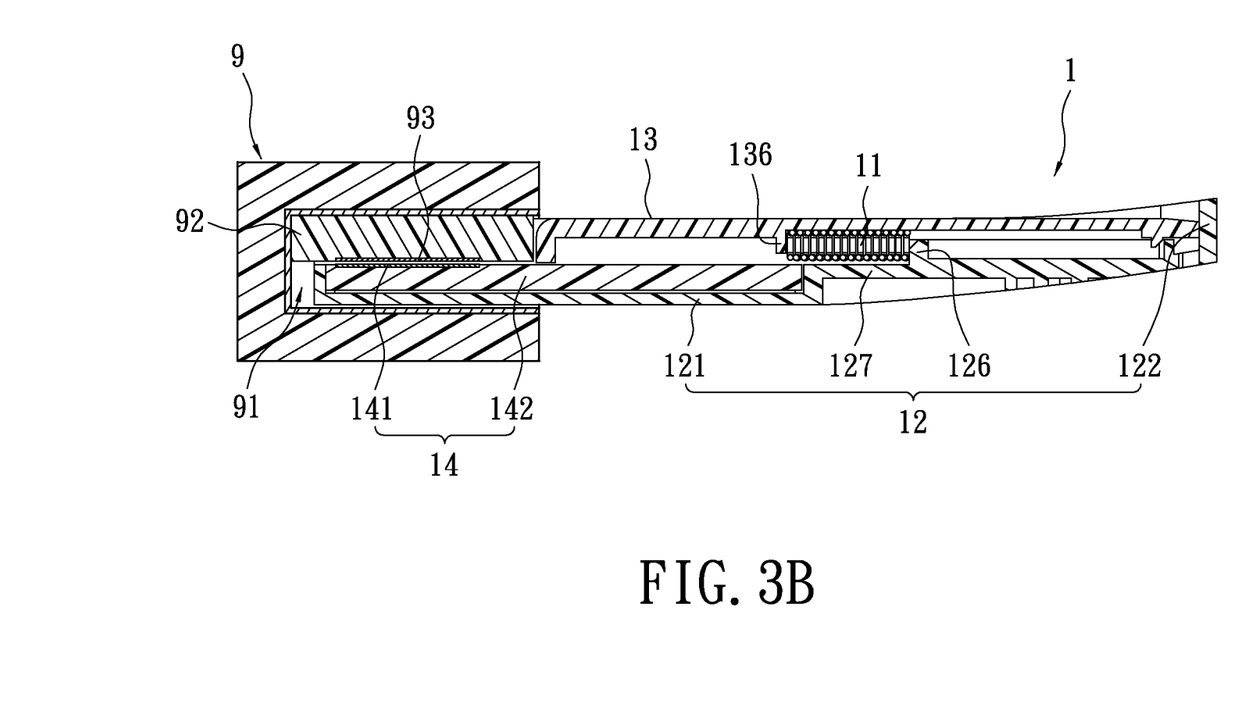
FIG. 3B is a cross-sectional view of the data storage device in FIG. 3A.

The data storage device 1 of the present invention can connect electrically to any typical 3C electronic device. The electrical connection is achieved through a receptacle 9 of the host electronic device for data transfer. The receptacle 9 has an insertion slot 91 defined thereon, an abutting portion 92, and a plurality of conducting strips 93. The conducting strips 93 are disposed underneath the abutting portion 92, where the abutting portion 92 is inside the insertion slot 91. Please refer to FIGS. 3A and 3B. FIG. 3A shows the data storage device 1 of the instant embodiment after it has been plugged to the receptacle 9, while FIG. 3B is a cross-sectional view of the data storage device 1 in FIG. 3A. When the data storage device 1 is plugged into the insertion slot 91 of the receptacle 9, the casing 12 is partially received by the insertion slot 91. Meanwhile, the abutting portion 92 presses against one end of the sliding member 13, forcing the sliding member 13 into a fixed state. In other words, as shown in FIG. 3B, the elastic member 11 is being compressed by the sliding movement of the sliding member 13 against the casing 12. Thereby, as shown in FIG. 3A, the internal pins 141 of the casing 12 may be exposed for physical contact with the conducting strips 93 (as shown in FIG. 3B). Thus, electrical connection is established to transfer electronic data or files.

After the file or data transfer has been completed, the user can directly pull the data storage device 1 out of the receptacle 9. The sliding member 13 is returned to its pre-plugging position by the restoring force of the elastic member 11. In particular, after the data storage device 1 had been separated from the receptacle 9, the elastic member 11 pushes the second abutting portion 136 axially, forcing the sliding member 13 to slide against the casing 12 to the pre-plugging position. Thereby, the pins 141 are re-concealed by the sliding member 13 for protection purposes. As previously mentioned, the length of the long side of the sliding member 13 is less than the length of the opposing sidewall members 122 of the casing 12. The difference allows the pins 114 to be exposed or concealed. Therefore, the data storage device 1 of the present invention uses the compression and restoration of the elastic member 11 to operate the sliding member 13, thus allowing the sliding member 13 to expose or conceal the pins 141 of the storage module 14 as necessary.

Thereby, the user can simply plug or unplug the data storage device 1 for usage without the need to remove the cap or use swiveling means. The simplification fits with today's fast-paced living environment. To reiterate the technical features of the present invention, the data storage device 1 uses the sliding movement by the sliding member 13 on the casing 12 to expose or shield the pins 141. The abutting portion 92 of the receptacle 9 and the restoring force of the elastic member 11 allow the sliding member 13 to self-slide over the casing 12 effectively.

Alternatively, the abutting portion 92 of the host receptacle 9 may be arranged on the periphery of the insertion slot 91 to achieve the same abutting capability.

Figure 4A:
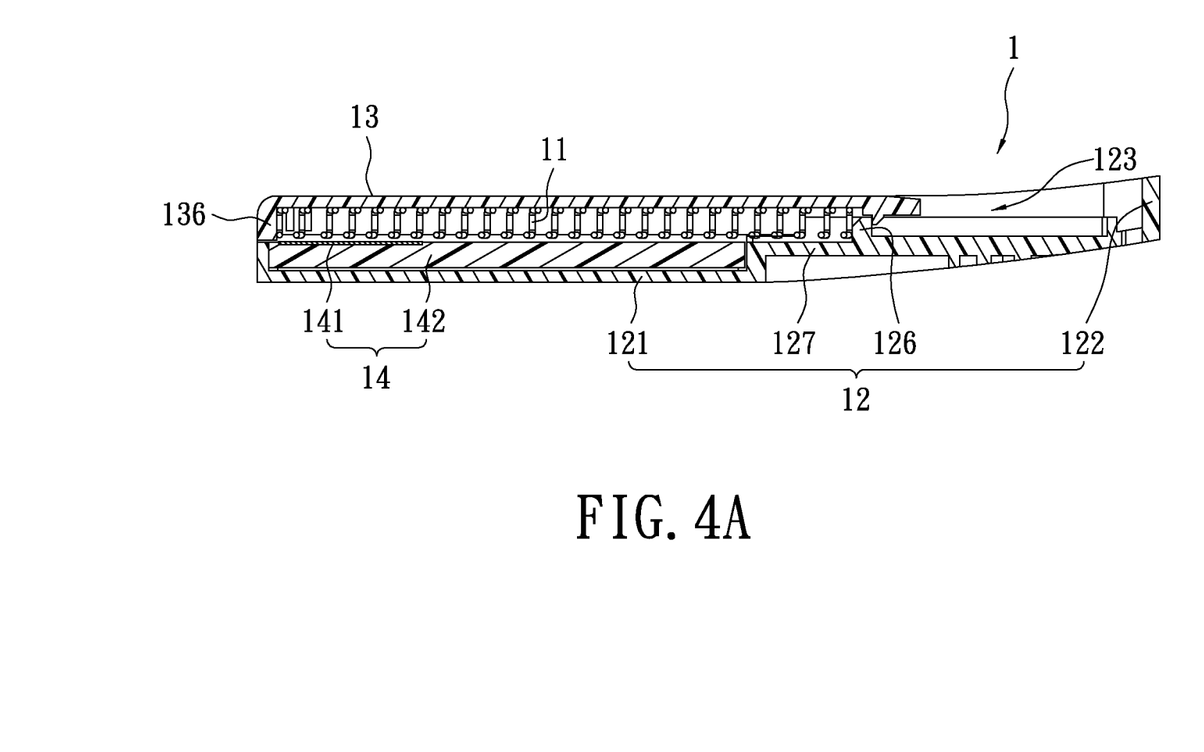
FIGS. 4A and 4B are cross-sectional views showing a data storage device of a second embodiment of the present invention before and after plugging into a receptacle, respectively.
Figure 4B:
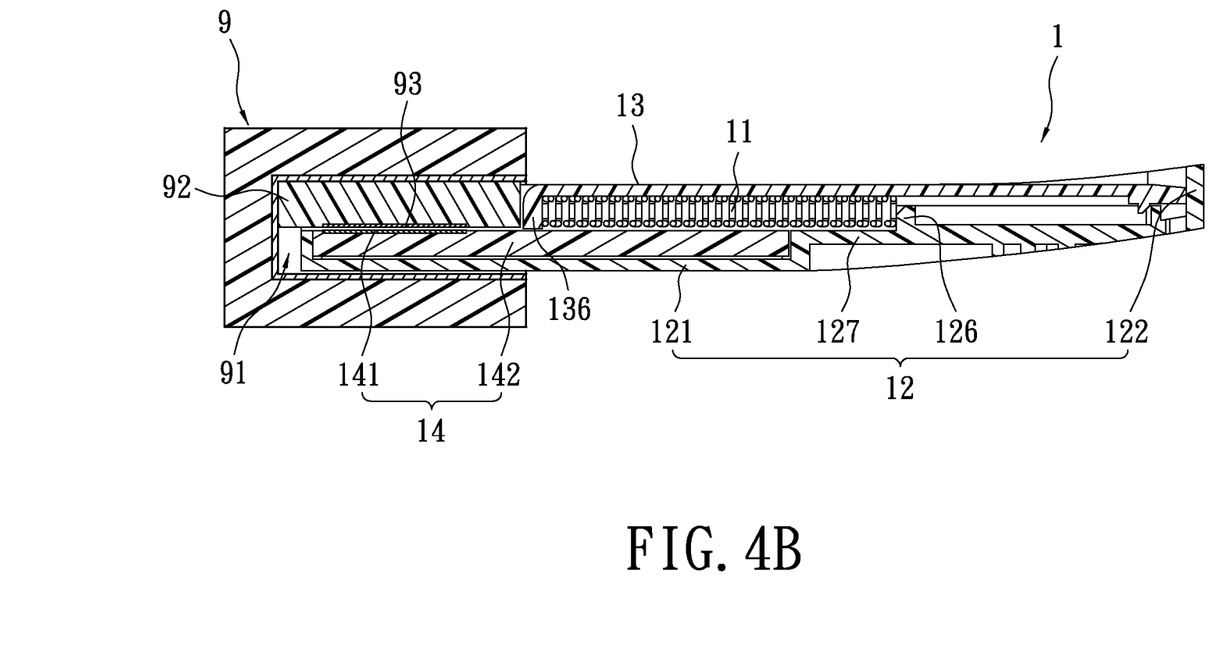

For a second embodiment of the present invention, please refer to FIGS. 4A and 4B. FIGS. 4A and 4B show the cross-section views of the data storage device 1 of the instant embodiment before and after plugging to the host receptacle 9, respectively. Same numerals are used for identical components between the first and present embodiment, with no further elaboration for these components. As shown in FIGS.

4A and 4B, the sliding member 13 has the second abutting portion 136 on one end thereof In other words, the second abutting portion 136 is an extended section of the sliding member 13. Therefore, the second abutting portion 136 and the sliding member 13 are integrally formed in one piece. When the data storage device 1 is plugged into the insertion slot 91, the second abutting portion 136 is pressed by the abutting portion 92 in compressing the elastic member 11. In other words, the location of the second abutting portion 136 on the sliding member 13 is not restricted.

In summary, the user can simply plug or unplug the data storage device 1 for usage without the need to remove the cap or use swiveling means. The simplification is very useful for everyday common applications.

The descriptions illustrated supra set forth simply the preferred embodiments of the present invention; however, the characteristics of the instant disclosure are by no means restricted thereto. All changes, alternations, or modifications conveniently considered by those skilled in the art are deemed to be encompassed within the scope of the present invention delineated by the following claims.

What is claimed is:

1. A data storage device, for connecting electrically to a host receptacle having an insertion slot defined thereon and an abutting portion inside the insertion slot, comprising:
    a storage module having a base board, a plurality of pins, and at least one memory unit, wherein the pins and the memory unit are electrically connected and disposed on the base board;
    a casing having a base portion and three sidewalls members extending vertically therefrom in defining an accommodating region for receiving the storage module, at least one guide block being disposed on each of the oppositely arranged sidewall members, and a support member arranged adjacently to the sidewall members and parallel to the base, wherein a first abutting portion is formed on the support member away from the sidewall members;
    a sliding member having a second abutting portion and guide rails corresponding to the respective guide blocks, wherein the support member is arranged between the base board and the sliding member, wherein the length of the long side of the sliding member is less than the length of the opposing sidewall members, wherein the sliding member selectively shield the pins; and
    an elastic member fixed to the first abutting portion and the second abutting portion on opposite ends thereof, wherein the compression and restoration of the elastic member operate the sliding member to selectively shield the pins.

2. The data storage device of claim 1, wherein the second abutting portion is at one end of the sliding member.

3. The data storage device of claim 2, wherein the abutting portion abuts the second abutting portion when the data storage device is plugged into the insertion slot.

4. The data storage device of claim 3, wherein the second abutting portion and the sliding member are integrally formed in one piece.

5. The data storage device of claim 1, wherein the sliding member is arranged on one side of the casing exposed outwardly.

6. The data storage device of claim 1, wherein the abutting portion is arranged inside or on the periphery of the insertion slot.

7. The data storage device of claim 1, wherein the elastic member is held by the sliding member and the casing thereinbetween.

8. The data storage device of claim 1, wherein the abutting portion abuts one end of the sliding member.

9. The data storage device of claim 1, wherein the base board is arranged parallely against the base when the storage module is disposed in the accommodating region.

10. The data storage device of claim 1, wherein the base board is arranged adjacently to the support member when the storage module is disposed in the accommodating region.

* * * * *